United States Patent [19]
Vockenhuber

[11] Patent Number: 5,450,072
[45] Date of Patent: Sep. 12, 1995

[54] ADDRESSING DEVICE

[76] Inventor: Peter Vockenhuber, 1427 Bonvillars, Bonvillars, Switzerland

[21] Appl. No.: 251,774

[22] Filed: May 31, 1994

Related U.S. Application Data

[63] Continuation-in-part of Ser. No. 807,843, which is a continuation-in-part of PCT/EP91/00883, May 10, 1991 abandoned.

[30] Foreign Application Priority Data

May 10, 1990 [CH] Switzerland ............... 01596/90

[51] Int. Cl.6 ........................ H04Q 9/00
[52] U.S. Cl. ............... 340/825.520; 340/825.57
[58] Field of Search ........... 340/518, 825.1, 825.43, 340/825.52, 825.57, 825.77, 825.78; 307/38, 40, 41

[56] References Cited

U.S. PATENT DOCUMENTS 4,438,434  3/1984  Wason ............... 340/825.51
4,603,318  7/1986  Philp ............... 340/518
5,226,123  7/1993  Vockenhuber ............... 395/525

FOREIGN PATENT DOCUMENTS

71367    2/1983  European Pat. Off. .
9001245  2/1990  WIPO .

Primary Examiner—Michael Horabik
Attorney, Agent, or Firm—Kenneth M. Massaroni

[57] ABSTRACT

An addressing device has a supply wire (1), an addressing wire (9), an information wire (2) and a reference wire (3) that connect to a multitude of addressable units (28). The address wire is connected to voltage references (16) of low output impedance (17). If a current signal is drawn through the address wire (9), the current originates from the addressable unit that is located next to the control unit (26) that has not yet been addressed. The current signal is used to address the unit. Once this addressing cycle is accomplished, the addressable unit (28) disconnects, and the following addressing action is received by the next addressable unit.

11 Claims, 4 Drawing Sheets

ADDRESSING DEVICE

This application is a continuation-in-part of prior U.S. application Ser. No. 07/807,843, which is a continuation-in-part of PCT/EP91/00883, May 10, 1991, by Peter Vockenhuber and now abandoned.

FIELD OF THE INVENTION

The invention relates to an addressing device for electronically addressing a plurality of electronic elements.

BACKGROUND

U.S. Pat. No. 5,226,123 to Vockenhuber proposes an addressing device that relies on the cable impedance to address a sequence of addressable units. That is, addressing is accomplished without using any specially coded addresses. Further all addressable units are of the same kind, and addressing is performed by a standardized signal. This innovation itself is remarkable as compared to the state prior of the art, where addressing was performed by specially coded individual addresses identifying the site of addressable units. The disclosure of the 5,226,123 patent is incorporated herein by reference.

Nevertheless, the proposed arrangement of the 5,226,123 patent has the disadvantage that high frequencies have to be used in order to address the unit, as the cable impedance is too low to sufficiently change the parameter of the standardized signal. High frequency implies a high power consumption by the used electronic components, thus making them more expensive to produce. Further, they imply high radio emissions of the used frequencies. This may make it necessary to shield the complete cable, proposed in the 5,226,123 patent in order to be compatible with the local radio emission requirements. This may have the undesirable effect of considerably raising production costs.

An additional disadvantage of the arrangement proposed in the 5,226,123 patent is the possibility of collectively addressing two nearby cells by the standardized signal. This may occur if the signal is insufficiently weakened between them. One may prevent that failure by using a higher addressing frequency, but this goes at the expense of the previously mentioned problems concerning the emitted power, the component cost, and power consumption.

Finally, one further disadvantage of an arrangement following the proposal in the 5,226,123 patent is that the impedance member, intended to weaken the standardized signal, has to be realized in the form of a capacitor, which is an electronic component that cannot be integrated on a chip.

BRIEF DESCRIPTION OF THE INVENTION

It is the objective of the present invention to overcome the above mentioned disadvantages. The invention is based on the insight that it is important for the addressing arrangement to dispose of an impedance member that is of low value compared to the longitudinal cable impedance. The only way to accomplish this, while using conventional electronic devices, is an active impedance member. This active impedance member is realized in the form of the output impedance of a voltage reference at the site of all cells. As the active impedance members are electronically regulated voltage sources that do not appreciably change under the load of varying currents, they have very low impedance values, which renders the addressing of the cells possible, even if the wire impedance of the address wire is comparatively low.

The invention describes measures intended to realize such an addressing arrangement using real components. Voltage references have certain tolerances originating from their fabrication process and their operating conditions, for example at different temperatures, that may only be reduced at a certain cost.

The electronic regulation of the output value of an addressable unit that is connected to the address wire, follows the voltage reference input, which may be either locally generated, or transmitted through the reference wire. However, this is done with an error term, the so-called offset voltage. This offset voltage is in general strongly temperature-dependent, and adds to or subtracts from the voltage to be regulated.

In applying the means set forth herein, it is anticipated, that the voltage drop across the cable impedance of the reference wire between two succeeding addressable units 28 has the effect that the following addressable unit produces a voltage at its addressing output, that is lower by this voltage drop. Accordingly, the voltage drop across the cable impedance must be higher than the offset voltage of the voltage reference of the concerned addressable unit in the worst case.

The measures described herein guarantee that this voltage drop between two succeeding addressable units always has the same value, and is independent of the distance between the control unit and the addressable unit.

Even if the correct choice of the respective impedances has been made, the drop of the reference voltage between two succeeding addressable units may vary slightly. This may occur in cases where a great number of addressable units are attached to a long cable. This is because the sum of the longitudinal impedances of the reference wire provoke a voltage difference across the reference wire that cannot be neglected, and hence the voltage drop between two neighboring cells may decrease. The measures described herein compensate for this effect.

The measures set forth herein provide that more than only one information source or information sink per addressable unit may be addressed. The invention further limits the valid range of the addressing signal current in order to suppress electromagnetic interference signals. The invention further provides that the address wire and the information wire may be combined in cases where information output is concerned.

The invention further describes the switches that are necessary for the addressing to take place. Switch 21, whenever closed, will have the effect of drawing current out of the first addressable unit of the invention that has its switch 15 in its closed position. This current is interpreted as addressing signal, switch 14 of this addressable unit will close, and information may be transmitted in whatever direction. At the end of this transmission, switch 21 opens, and this will make the switches 15 and 14 of the addressed unit open. Thus, when the switch 21 is closed the next time, the following addressable unit will be addressed, and so on, until the last addressable unit of the arrangement has been addressed. The object of the present invention may then be brought to its initial state where all switches 15 of the addressable units are closed, and all switches 14 are open, so that the next time when switch 21 is closed, current will be drawn out of the first addressable unit Z1. The invention also describes an addressable unit for the addressing arrangement, and a simple control unit for the addressing arrangement.

DETAILED DESCRIPTION OF THE INVENTION

Figure 1:
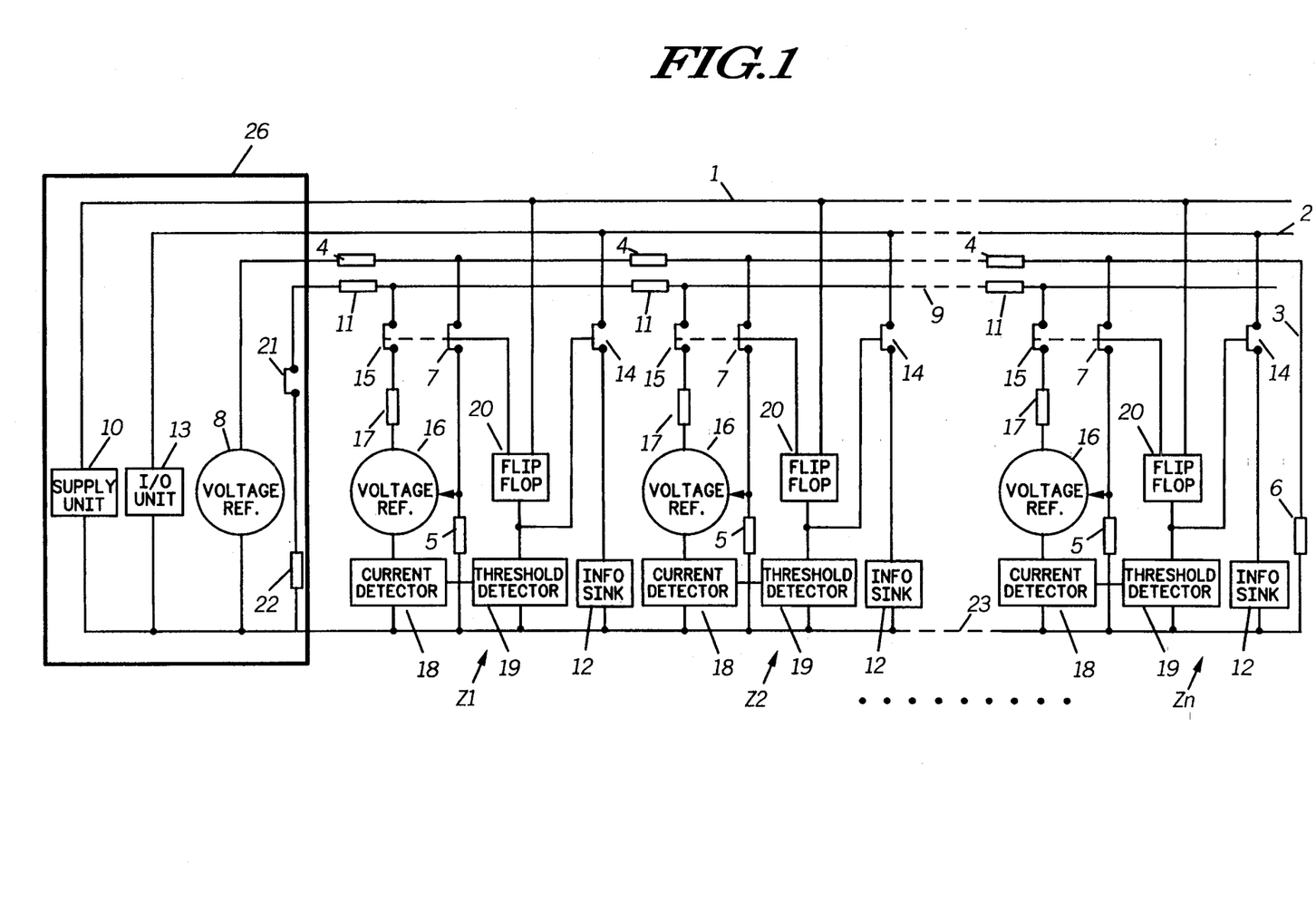
FIG. 1 is an overview of an addressing arrangement as proposed by the invention.

FIG. 1 shows a typical execution example of an addressing arrangement in accordance with the invention. As shown, the arrangement comprises five (5) wires 1,2,3,9,+23 mutually connecting the addressable units 28 (of FIG. 2) Z1, Z2 to Zn to the control unit 26. It is to be understood that any number of addressable units (i.e., a unit capable of being addressed) may be advantageously used in this arrangement. The addressable units may be any node, cell, or unit capable of establishing point-to-point communication, and may be, for example, a distributed shift register.

One wire is the supply wire 1 which is connected to a supply unit 10 that provides appropriate voltage between the supply inputs and the ground wire 23 for all cells. The information wire 2 connects all the local information sources or information sinks 12 via the information switch 14 to a centralized information input/output unit 13 that determines the direction and kind of information flow. The input/output unit 13 must be capable of reading information from the information sink 12, and communicating that information. In this regard, the input/output unit may include the arrangement as indicate in FIG. 5 of U.S. Pat. No. 5,226,123, the disclosure of which is incorporated by reference.

The addressing is performed as follows: as soon as the addressing switch 21 of the control unit 26 is closed, corresponding current will be drawn through the address wire 9 and the limiting resistor 22. Since the output impedance 17 of the voltage reference 16 at the first addressable unit is considerably lower than the longitudinal impedance of the address wire 11 that located between the first addressable unit Z1 next to the control unit and its successor Z2, this current will be drawn out of the voltage reference 16 of this first addressable unit Z1. The relationship between the output impedances 17 of the voltage references 16 and the longitudinal impedance of the address wire makes sure that only the first cell Z1 will be addressed and not the second.

The switch 21 may be a transistor, a field effect transistor, a relay, an optoisolator-circuit, or equivalent, that is controlled by a microprocessor, but any other switching means will be able to control the addressing of the present invention. Thus, it is possible to address one addressable unit after the other by hitting a mechanical key that closes the contact of switch 21. The transmission of information may be used to perform whatever communication task. For example one may read sensor data from a sensor that is connected to the addressable unit through the information wire 2, switch a telephone network or connect computers or related peripherals.

Of course, the longitudinal impedances 4 and 11 of the respective address 9 and reference 3 wires are not necessarily electronic components. One will prefer to use a cable, the wire impedance of which corresponds to this impedance value. For such a cable one has to interpret the impedances 4 and 11 of all figures as equivalent values for the longitudinal impedance of the considered wire. Values of this cable impedance are usually between 10 and 100 Milliohms per meter, and this will be sufficient to distinguish the addressing signals of the addressable units of the present invention, when spaced at approximately one meter. However, if a closer spacing of succeeding addressable units is demanded, electronic components with a corresponding impedance may be inserted.

The same is valid for the symbols, standing for the output impedance 17 of the reference voltages 16 of the figures, which are not real impedances. The symbol stands for the equivalent value of their output impedance, and it is drawn for clarity purposes in the context of the addressing principle.

At the site of the addressed cell Z1, the addressing current is measured by the current detector 18, which may be a resistor. The corresponding signal is fed to a threshold detector 19. Preferentially, this threshold detector 19 will be a schmitt-trigger with hysteresis. As soon as a predetermined upper threshold is overridden it changes state, closes the information switch 14, and connects the information source or information-sink 12 with the information input and/or output device 13.

In this state information, in whatever direction, may be transmitted. As soon as the transmission is terminated, the addressing switch 21 opens, no more current flows through the address wire 9 and the current detector 18, and the threshold detector 19 resets, opening the information switch 14 and the flip flop 20 changes state. By opening the switch 14, the addressable unit is separated from the centralized input/output unit, and the transmission is stopped. The information switch 14 may be a transistor, a field effect transistor, a relay, an optoisolator-circuit, or equivalent, that is controlled by the threshold detector 19, connecting the information source or information-sink 12 with the information wire in an adequate manner.

Figure 4:
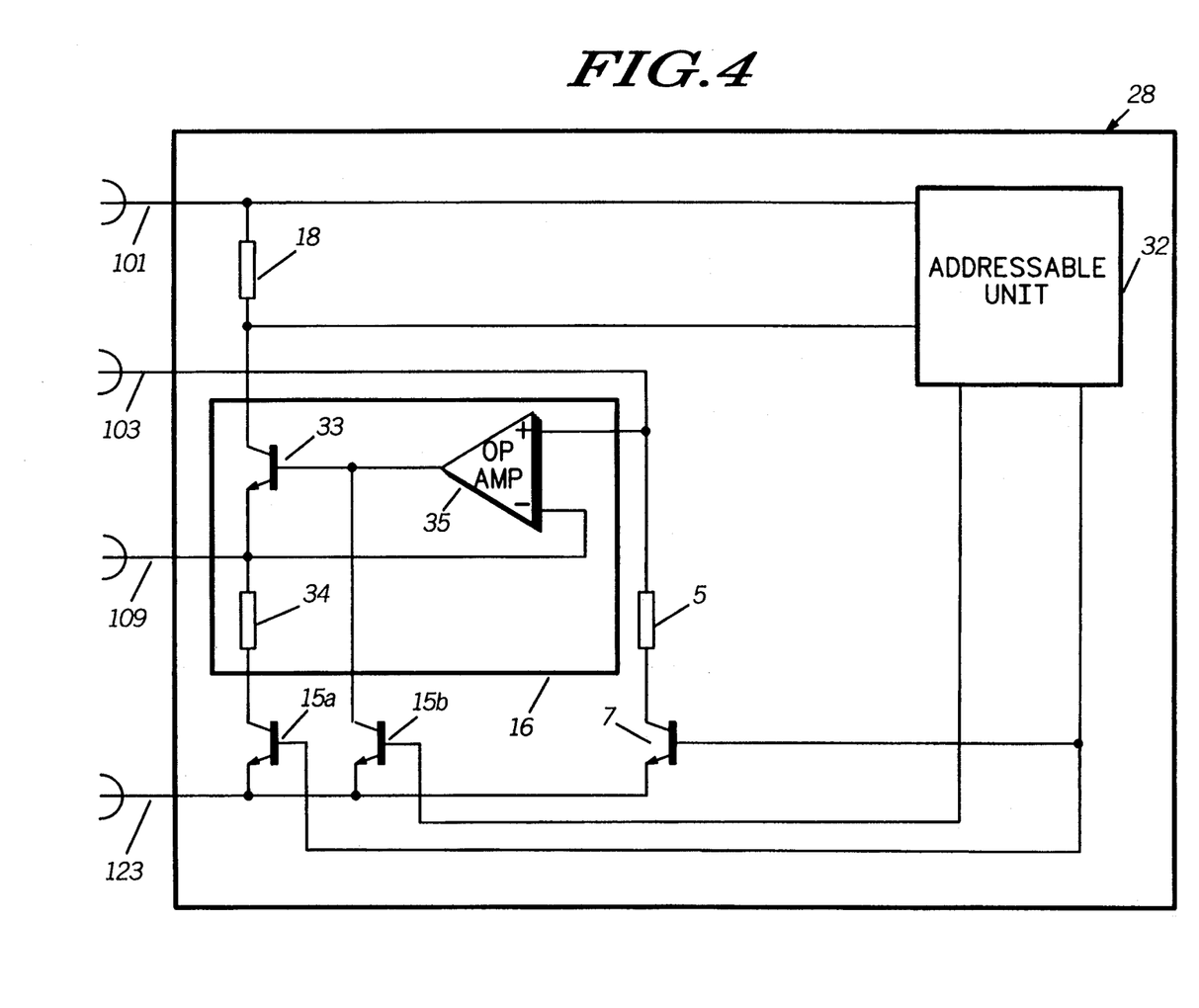
FIG. 4 illustrates an addressable unit using electronic circuitry in accordance with the instant invention.

The flip flop 20 disconnects the cell Z1 from the address wire 9 by opening the address switch 15 and from the reference wire 3 by opening the reference switch 7. The switches 15 and 7 may be a transistor, a field effect transistor, a relay, an optoisolator-circuit, or equivalent, that is controlled by an output signal of the flip flop 20, and that establishes a connection of low impedance with the respective wires 9 and 3 when closed, and isolates the wire from the cell when opened. Refer to FIG. 4, where a preferred embodiment of the switch 15 is described. The cell will remain in this state until the supply voltage will be shut down and eventually brought up again, which will reset the flip flop 20 to its starting position, where the address switch 15 and the reference switch 7 are closed, and the information switch 14 is open.

This addressing cycle for a cell is repeated, and the next cell Z2 is addressed, and the first one is disconnected. This second cell Z2 will finally disconnect from the wires 2, 3 and 9 when its addressing cycle is over, and the addressing cycle will repeat until the last cell Zn of the cable is addressed. Eventually the whole system is reset to its starting position by shutting down the supply voltage and bringing it up again. The reset member necessary to accomplish this has not been drawn in the figure. It is evident that the reset function may be accomplished by a dedicated reset wire, or by a special state of the reference wire. These expedients are known to those of ordinary skill in the art.

The voltage present at the input of the controllable voltage reference 16 is the result of the longitudinal impedance of the reference wire 3, the transversal reference impedance 5, and of its terminating impedance 6. By proper choice of this terminating impedance 6, one may obtain a total impedance composed of all longitudinal and transversal impedances of the arrangement, that is constant and does not depend on the site of the addressed unit.

This proper choice of the values of the terminating impedance 6, and of the transversal impedances 5 of the reference wire, as mentioned above, which is a well-known technique, guarantee that the current that drains through the reference wire 3 towards the not yet addressed rest of the cable, is constant, provided that all addressable units that have already been addressed, did open the reference switch 7. This implies that the voltage difference between two reference inputs of succeeding addressable units is always of the same value and does not depend on the address of the addressable unit.

One may use this voltage difference in order to compensate for tolerances, imprecisions and temperature dependencies of the reference voltages 16 of the individual addressable units, that one has to account for in real cases.

As this voltage difference is only a function of the current that flows through the reference wire and of its longitudinal impedance 4, it may be of almost any value. If one supposes that the cable properties and the properties of the addressable unit are determined, this voltage difference is only a function of the cable terminating impedance. By proper choice, a compromise between the power consumption and the production cost or the cost to adjust the precision of the addressable units of an arrangement as set forth by the invention, is achievable. All voltage values of the addressable units are referred to the ground wire 23.

Figure 2:
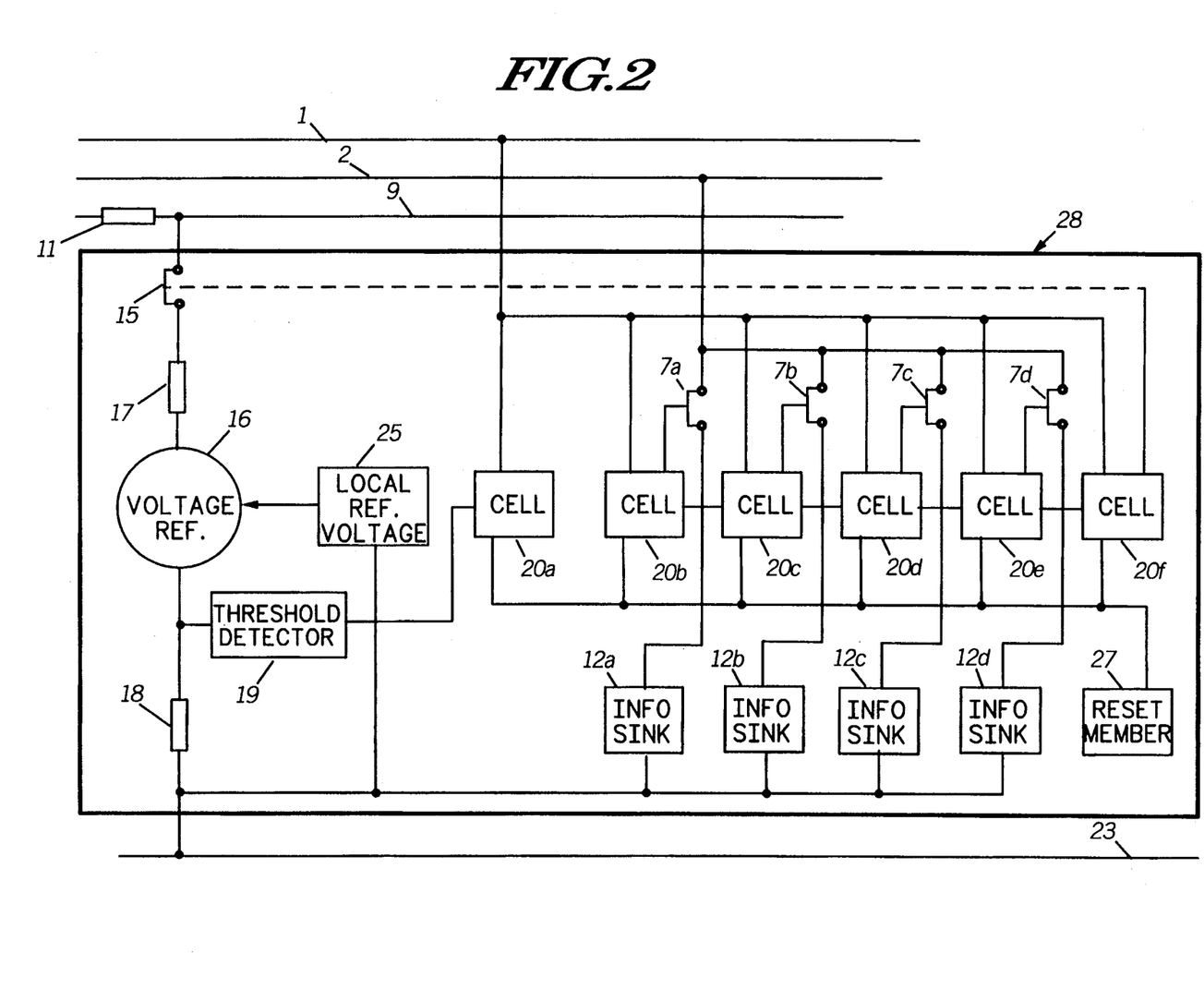
FIG. 2 illustrates a cell that works without a reference wire and where four different input or output operations may be performed by the addressable unit in accordance with the instant invention.

FIG. 2 shows an addressable unit 28 attached to the information wire 2, the address wire 9 and to the supply and the ground wires 1 and 23. This is a variant of the invention using four wires and no reference wire. As already mentioned, this embodiment may be accomplished by either using a very precise reference voltage 25, by choosing a sufficiently high value for the longitudinal impedance 11 of the address wire, or by choosing a very low value for the output impedance 17 of the local reference voltages 16 or by any combination of these measures.

The local reference voltage 25 is present in every addressable unit and its value controls the voltage reference 16. The precision of this local reference voltage must be sufficiently high so that no intolerable values of voltage differences at the output of the addressable units create a current through the address wire, which in turn may be detected by the current detector 18 of a neighboring cell.

iT is left to a cost trade-off to decide whether it is advantageous to realize such a precise local voltage reference 25 at the site of all addressable units (FIG. 2), or to transmit a common reference voltage to all addressable units by a special reference wire (FIG. 1).

The example in FIG. 2 illustrates the control of more than one information source or information-sink 12 at the site of the addressable unit 28. This may be especially advantageous if one desires to send and receive information, the location of which is the same. As an example one could consider the measurement of the local temperature and the control of extinction valves for fire protection at the same site by a single addressable unit.

The addressing of the information sources or information sinks 12a, 12b, 12c, 12d of FIG. 2 is accomplished in a sequential manner. At the moment when the power supply comes up, a reset member 27 such as a monostable one-shot circuit, generates a defined state of the shift register, that is composed of the cells 20a to 20f. This state is characterized by all cells 20b to 20f being set to logical zero, and the cell 20a to logical one.

The shift register cells control the information switches 7a to 7d of the respective information sources or information sinks 12a to 12d. If their output is logical one, the switches 7a to 7d are closed, otherwise they are open. The shift register cell 20f is connected to the address switch 15 of the cell 28, and an output of logical zero closes, while one of logical one opens the switch.

At every instant where the threshold detector 19 changes state, the contents of the shift register, composed of the cells 20a to 20f are shifted right by one place. At the first detection of the threshold detector the switch 7a is closed, and information is transmitted, at the second detection the switch 7b is closed, and so forth until the last information switch 7d is closed.

At the instant of the next detection of the threshold detector the shift registers 20a to 20f will shift their contents once more to the right by one place, and this will open all switches of the addressable unit, including the address switch 15. In consequence, the following addressing cycle will be received by the next addressable unit 28 that succeeds the one that has just been addressed.

An addressable unit in this state maintains the power supply only for the shift register, and all other power consuming circuitry is disconnected. At the instant when the next reset and power up occurs, the reset member 27 will create the above mentioned initial state.

One may, of course continue the cascaded alignment of shift register cells 20a to 20f indefinitely in order to concentrate a great number of inputs and/or outputs at the site of the addressable unit.

Figure 3:
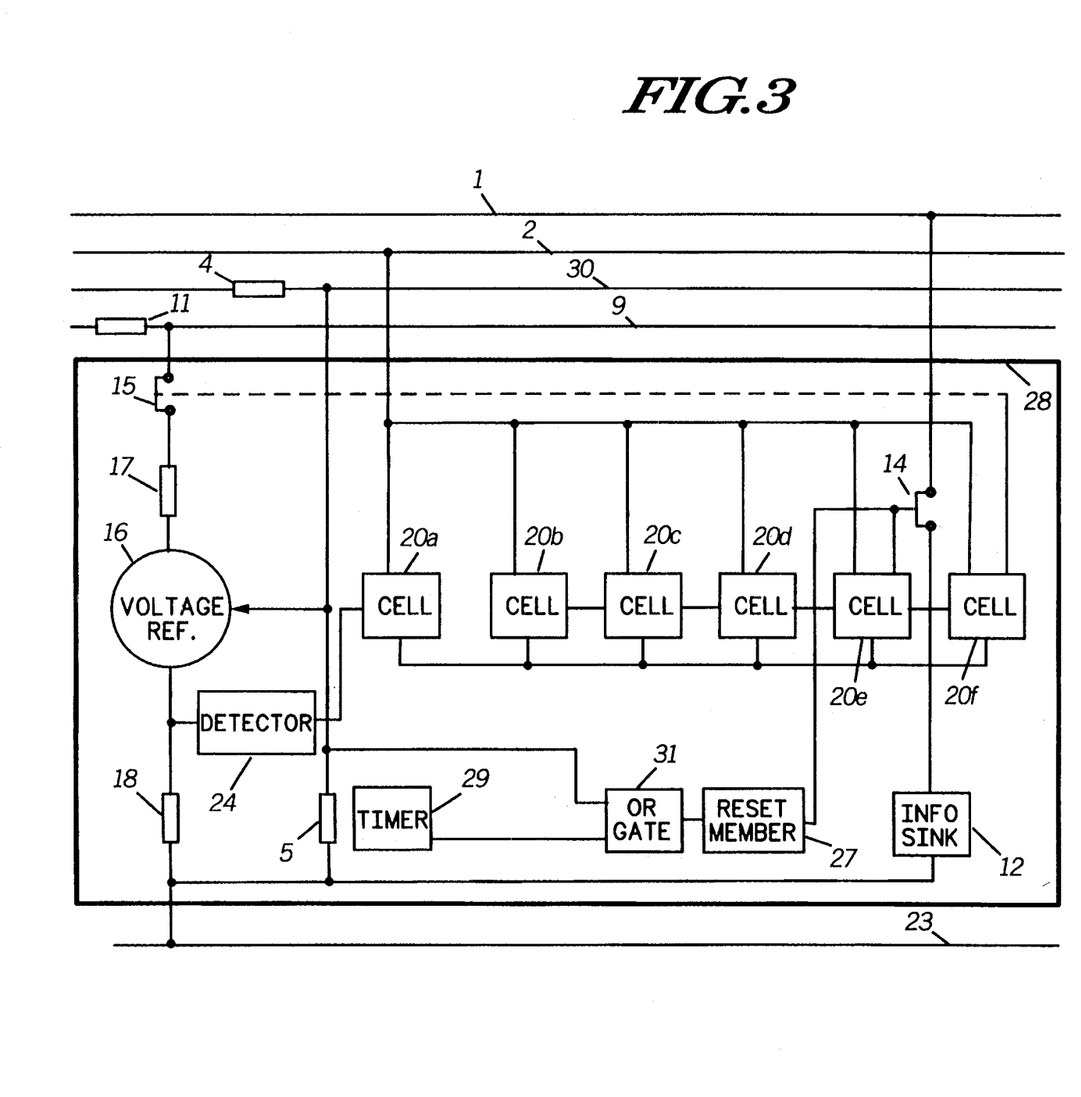
FIG. 3 illustrates a cell with measures intended to suppress electromagnetic interference signals in accordance with the instant invention.

FIG. 3 shows addressable unit 28 of a five (5) wire version of the present invention. This is a version comprising the supply wire 1, the information wire 2, the ground wire 23, an address wire 9 and a combined reset- —and reference wire 30. Where this wire 30 transmits a common reference voltage, that is generated in the control unit 26, to all addressable units, in a similar manner as in FIG. 1.

The impedances 4, 5, and 6 lower the reference voltage signal as already explained with respect to FIG. 1. The example in FIG. 3 shows the suppression of interference signals. It is of great importance for real systems that are exposed to electromagnetic interference that the addressing technique that is performed by the transmission of current signal works satisfactorily. One has to guarantee that currents that are induced in the address wire will not inadvertently trigger the address of one or more cells.

Besides the usual measures for electrical interference suppression that are normally provided, as the shielding of the cable and/or the use of twisted wire pairs for sensible signals with their own ground wire, provision is made for two further measures, that are explained following the execution example of FIG. 3.

The first measure is the provision of the function of the threshold detector 19 (of FIG. 1) in the form of a window detector 24. It will issue an output signal if and only if the input voltage that is taken from the current detector 18 has been found between a minimal and a maximal permissible value during a certain time.

Figure 3A:
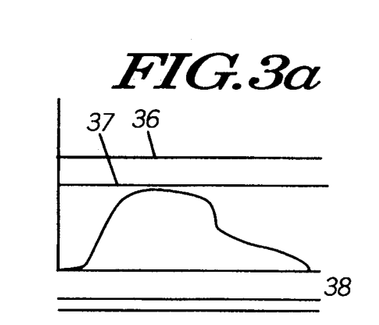
Figure 3B:
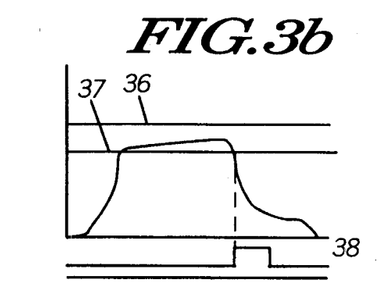
Figure 3C:
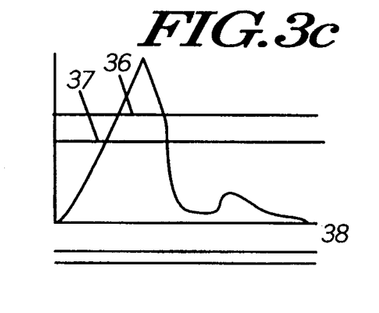

This function is explained in the FIGS. 3a,3b and 3c where three different input signal forms are drawn. The signal of FIG. 3a shows an insufficient signal for the trespassing of the detector. The signal's amplitude is always below the minimal permissible value 37. The detector will in contrast issue an output signal in the case of the signal drawn in FIG. 3b as soon as the input signal falls below the minimal permissible value 37, while the input signal form drawn in FIG. 3c will not yield a detection signal as the maximal permissible value 36 has been surpassed.

This permits the elimination of less important interference signals, the amplitude of which falls below the minimal permissible value 37, and of more important interference signals that override the maximal permissible value 36, from the addressing current signal. At the site of the control unit, provision is made by the current limiting resistor 22 that the current that flows in the state where the addressing switch 21 is closed, corresponds approximately to the mean value between the minimal and the maximal permissible values 37 and 36.

No further explication is given for the electronic circuitry, that is necessary to realize the window detector, as it is composed of a combination of standard electronic components, using schmitt triggers, logic gates, and flip flops to obtain the wanted function. One may memorize the trespassing of the maximal permissible value 36 in a flip flop, the logic state of which is read at the negative going edge of the input signal through the threshold that is defined by the minimal permissible value 37. If at that moment the flip-flop is set, no output signal is issued. In the other case, the minimal permissible value 37 has been trespassed and not the maximal permissible value 36. If this is the case, the value of the addressing current has been found to be within the permissible range, and a monostable one-shot may issue an output signal indicating successful addressing.

The second measure for interference suppression comprises a shift register made of the cells 20a to 20f. This shift register is loaded by a reset member 27, where, as already mentioned, the first cell 20a is loaded with logical one, and all other calls with logical zero. The reset member will load the shift register if there is a corresponding signal at its input.

This input of the reset member is connected via an "or" gate 31 to the combined reference—and reset wire 30. If the reference voltage at its input falls below the threshold of the "or" gate 31, it will issue a corresponding signal to the reset member 27, and the shift register 20a to 20f will be set to its initial state.

The addressing cycle for the addressable unit 28 goes on as follows: Every time the window detector 24 issues a signal, the contents of the shift register are shifted right one place. After the fourth output signal of the window detector the cell 20e of the shift register changes state and the switch 14 is closed for information transmission. At the same time the cell 20e of the shift register issues an inhibit signal to the reset member 27 preventing it to abort an ongoing information transmission by a reset signal to the shift register.

The next following pulse issued by the window detector 24 will shift the contents of the shift register right by one place, and the switches 14 and 15 are opened. If, by interference in the address wire, the window detector issues an output signal, the contents of the shift register will be shifted right one place for every such event.

The timer, the output of which is connected to one of the inputs of the "or" gate 31 will regularly reset the shift register 20a to 20f by the reset member 27. As a consequence, it is necessary, in order to successfully address the addressable unit 28, that at least four pulses are issued by the window detector 24 before the timer 29 resets the entire shift register.

Of course it is possible, to insert any number of shift register cells between the cell that starts the addressing action and the cell 20f that terminates it. This is not shown in FIG. 3. The result would be that one needs a certain number, say four pulses of the window detector 38, to terminate the addressing, and the addressing security will be higher while information is transmitted.

This technique will be specially advantageous if the information transmission takes a long time. In this case, the reset member 27 will have to be modified so that it cannot issue a reset signal, that is caused by interference signals, while the information transmission is still ongoing.

FIG. 4 shows the electronic circuitry and the reference voltage 16 of an addressable unit 28 in detail. Only the input stage of the addressable unit and its interface to the supply wire 101, the reference wire 103, the address wire 109 and the ground wire 123 is shown. The details of the rest 32 of the addressable unit are not drawn.

The reference voltage 16 comprises a transistor 33 and an operational amplifier 35, that, together with a biasing resistor 34, are connected in such a manner, that the reference-output 109, attached to the address wire 9, is at the same voltage level as the reference input 103, attached to the reference wire 3. The reference input 103, that is attached to the reference wire 3 is connected to the transversal reference impedance 5.

The output voltage of the reference voltage 16 is regulated in a feedback-loop and it is independent of the output current that is drawn through the address wire 9. Consequently, the output impedance of the reference voltage 16 will be very low.

As current is drawn out of the reference voltage 16, the voltage at its output pin 109 will not change appreciably, but the voltage across the current detector, which is a resistor in the example, will change in proportion to the current in the address wire 9.

If the voltage across the current detector 18 becomes greater than a predetermined value the other parts 32 of the addressable unit 28 will work as provided and eventually when the transmission is over they will provide the signals to open the switches 15a, 15b and 7.

The switches are transistors in the example, that change to a state of high impedance between the collector and emitter pins, as the base voltage is lower than its threshold.

The switch 15 in the example of FIG. 4 is doubled, and one part 15a of it disconnects the biasing resistor 34 from the ground wire, and the other part 15b closes the transistor 33 by shorting its base to the ground wire. The transistor 33 has two functions, namely once as voltage regulator, and, if its base is grounded by the secondary transistor 15b, as switching element.

The transistors 15a and 7 commute at base signals of zero volts, but the transistor 15b at a positive voltage, and the circuitry 32 in FIG. 4 has two complementary outputs that issue the same signal once with positive and once with inverted polarity to the respective transistors.

of course it is possible, to invert the circuitry in the sense that the addressing current flows into the addressable unit 28, where it is measured by a resistor that is connected to ground, and where this current signal is interpreted as an addressing signal.

In this case, all NPN-transistors have to be replaced by their PNP counterparts, and the circuit will work in an equivalent manner as in FIG. 4, where all polarities and the current flow direction are inverted. Of course, in this case, the resistor 22 has to be tied to a positive voltage instead of to ground.

Furthermore it is possible and it will be the preferred choice in a heavily disturbed environment, to provide two address wires, one of them sourcing current to, and the other sinking current out of the addressable unit. In this case, the address detector is modified so that the two address currents have to be measured at the same time in order to validate the address. As in general, interfering induced currents in the address wire have the same direction, this method constitutes a very efficient way to suppress interference signals.

I claim:

1. An addressing arrangement comprising a cable, an address generator and a plurality of addressable units, serially connected to said address generator by said cable, said cable comprising a address wire, an information wire, and at least one supply wire, each of said addressable units operates in any one of three conditions comprising an initial state, an activated state, and an inactivated state, wherein one addressable unit after the other is transferred from its initial state to its activated state, and wherein each time the next following addressable unit is transferred from its initial state into its activated state only after the preceding addressable unit has been transferred from its activated state into is inactivated state, so that only one addressable unit is in its activated state at a time, each of said addressable units comprising a detector, and an addressing switch, which is closed during said initial state and during said activated state, and which is opened after said activated state and stays open during said inactivated state of each individual addressable unit, each addressable unit further comprising an information switch which is open during said initial state and during said inactivated state, wherein said information switch is closed during the activated state of an addressable unit so that the information switch of only said one addressable unit which is in its activated state is closed, while the information switches of all other addressable units in the arrangement are open, wherein information is transmitted across said information switch between a central information input/output means and an information source on the side of said addressable unit which is in its activated state, and wherein after transmission of said information the address switch of said unit in its activated state and its information switch are open to transfer said unit from its activated to its inactivated state, wherein each addressable unit further comprises:

a reference voltage means producing a defined voltage and traversed by current of variable voltage intensity while producing said define voltage, and reference voltage means having an input impedance sufficiently lower than an impedance of a section of said cable located between two adjacent addressable units, and said reference voltage means being connected to said address wire by said address switch;

a current detector for detecting whether the current flowing through said reference voltage means is below or above a defined threshold;

said information switch which is open during said initial state being closed in response to the detecting of a current through said reference voltage means exceeding said threshold, thereby transferring said addressable unit, which comprises said closed information switch, from its initial state into its activated state, said information switch connecting or disconnecting said information wire from said information source of said addressable unit which is in its activated state;

said address generator including a switch which, when closed, permits the flow of a current through said address switch and reference voltage means of all units wherein address switches are closed;

said threshold being chosen so as to be exceeded only by the current following through the addressable units which are in their initial state, which is the closest to the address generator, said current flowing through said closest addressable unit being higher than the currents flowing through all following addressable units due to a higher total impedance of each following unit compared to the total impedance of its immediately preceding unit, the total impedance or a particular unit being the sum of the impedance of all cable sections between the address generator and said particular unit; and the opening of said address switch of said addressable unit in its activated state after transmission of said information increasing the impedance of said unit, thus enabling the next following unit to produce a current which exceeds said threshold.

2. An addressing arrangement as set forth in claim 1, wherein a voltage reference (16) is generated by a centralized reference voltage (8) of the arrangement in a control unit (26), and where said voltage reference is transmitted by a reference wire (3) to all addressable units.

3. An addressing arrangement as set forth in claim 2, wherein the reference wire (3) is characterized by a longitudinal impedance (4), a transversal impedance (5) and a terminating impedance (6), the proportions between which assure that the total impedance of the reference from the addressed unit toward the terminating impedance has always the same value and is independent of the location where the addressable unit is attached to the cable.

4. An addressing arrangement as set forth in claim 3, wherein the transversal impedance (5) of the reference wire that belongs to addressable units (28) that are already addressed, are disconnected from the reference wire.

5. An addressing arrangement as set forth in claim 2, wherein the reference voltage (8) of the control unit (26) is generated in such a manner that the reference voltage that is output to the reference wire is regulated corresponding to the current drawn, and where the reference voltage drop between the addressed unit and the next addressable unit is constant, and does not depend on the site of the addressable unit.

6. An addressing arrangement as set forth in claim 1, wherein by a first addressing action a first information source or-sink (12a) is connected to the centralized information input/output means (13), that by a second addressing action a second information source or-sink (12b), and so forth, until by a last addressing action the addressing of the last addressable unit (28) is terminated.

7. An addressing arrangement as set forth in claim 6, wherein the condition that the addressing current flowing through the addressing wire is interpreted as signal to start or terminate the addressing of the addressable unit is, that a certain number of detections have to occur during a time, that is determined by a timer (29).

8. An addressing arrangement as set forth in claims 1, wherein the detection of an addressing current takes place only if the value of the current is higher than a predetermined minimal value (37) and lower than a predetermined maximal value (36).

9. An addressing arrangement as set forth in claim 8, wherein the addressing current determines the addressing of the addressable unit (28) the value of which is information that is transmitted to the addressable unit by the control unit (26), combining the functions of the address wire and of the information wire in a common wire.

10. An addressing arrangement as set forth in claim 1, wherein said addressable unit further comprises a control unit having a supply unit(10) providing an appropriate voltage supply between the wire supply (1) and the ground wire (23) and information input/output means (13) able to send or receive information through the information wire (2) to a current source or current sink (22), that is connected to the address wire by said information switch (21), where an electronic circuit establishes the correspondence between the number of the controlling pulses issued to said information switch (21) and the address of the addressable unit.

11. An addressable unit comprising:
a reference voltage (16) of low output impedance (17) connected to an address wire;
a current detector (18) and a threshold detector (19) for detecting the signal generated by the current detector; and
an address switch (15) and an information switch (14) where the address switch (15) is controlled by a flip flop (20), the information switch (14) and flip flop (20) are controlled by the threshold detector (19); wherein the address switch (15) connects the reference voltage (16) to an address wire (9), and where the information switch (14) connects an information wire (2) to an information sink or—source (12).

* * * * *